United States Patent
Foley et al.

(10) Patent No.: US 12,299,451 B2
(45) Date of Patent: May 13, 2025

(54) SECURING REGISTERS ACROSS SECURITY ZONES

(71) Applicant: TEXAS INSTRUMENTS INCORPORATED, Dallas, TX (US)

(72) Inventors: David P. Foley, Sugar Land, TX (US); Alexander Tessarolo, Lindfield (AU); Alan L. Davis, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 126 days.

(21) Appl. No.: 17/897,016

(22) Filed: Aug. 26, 2022

(65) Prior Publication Data
US 2024/0069920 A1  Feb. 29, 2024

(51) Int. Cl.
*G06F 9/38* (2018.01)
*G06F 9/30* (2018.01)

(52) U.S. Cl.
CPC ........ *G06F 9/3851* (2013.01); *G06F 9/30043* (2013.01); *G06F 9/30054* (2013.01); *G06F 9/30185* (2013.01)

(58) Field of Classification Search
CPC ............... G06F 9/3851; G06F 9/30043; G06F 9/30185; G06F 9/30054
USPC .................................................. 712/228, 242
See application file for complete search history.

(56) References Cited

U.S. PATENT DOCUMENTS

| | | | | | |
|---|---|---|---|---|---|
| 4,445,173 A | * | 4/1984 | Pilat | ..................... | G06F 9/4484 712/228 |
| 4,733,346 A | * | 3/1988 | Tanaka | ..................... | G06F 9/462 712/228 |
| 4,777,588 A | * | 10/1988 | Case | ..................... | G06F 12/1458 712/E9.082 |
| 5,210,874 A | * | 5/1993 | Karger | ..................... | G06F 9/4484 712/E9.082 |
| 5,321,823 A | * | 6/1994 | Grundmann | ............ | G06F 9/462 712/226 |
| 5,414,864 A | * | 5/1995 | Koizumi | ............. | G06F 12/1425 712/228 |
| 5,682,531 A | * | 10/1997 | Nakamura | ............ | G06F 9/3861 712/228 |
| 6,199,156 B1 | * | 3/2001 | Yoder | ................... | G06F 9/3004 712/228 |
| 6,209,085 B1 | * | 3/2001 | Hammond | .............. | G06F 9/463 712/228 |
| 6,970,998 B1 | * | 11/2005 | Favor | .................... | G06F 9/3016 712/226 |
| 7,640,421 B1 | * | 12/2009 | Garlick | ................... | G06F 9/461 712/228 |

(Continued)

*Primary Examiner* — Keith E Vicary
(74) *Attorney, Agent, or Firm* — Brian D. Graham; Frank D. Cimino (57) ABSTRACT

In an example, a system includes a processor, where the processor includes a plurality of processor registers, and where the processor is configured to execute a first instruction in a first execution context. The processor is also configured to receive a PRESERVE instruction that indicates at least one processor register among the plurality of processor registers. The processor is configured to, responsive to the PRESERVE instruction, preserve parameters in the at least one processor register and clear other processor registers in the plurality of processor registers in the first execution context. The processor is also configured to execute a second instruction in a second execution context.

20 Claims, 5 Drawing Sheets

(56) References Cited

U.S. PATENT DOCUMENTS

| | | | | |
|---|---|---|---|---|
| 8,762,692 | B2* | 6/2014 | Schuchman | G06F 1/324 |
| | | | | 712/228 |
| 10,318,302 | B2* | 6/2019 | Tran | G06F 9/3858 |
| 2001/0049710 | A1* | 12/2001 | Curey | G06F 9/4843 |
| | | | | 718/100 |
| 2004/0105298 | A1* | 6/2004 | Symes | G06F 9/4812 |
| | | | | 714/E11.207 |
| 2006/0075236 | A1* | 4/2006 | Marek | H04L 9/0894 |
| | | | | 713/171 |
| 2006/0149940 | A1* | 7/2006 | Mukherjee | G06F 9/461 |
| | | | | 712/228 |
| 2008/0270772 | A1* | 10/2008 | Inoue | G06F 9/462 |
| | | | | 712/228 |
| 2009/0089564 | A1* | 4/2009 | Brickell | G06F 9/3844 |
| | | | | 712/E9.045 |
| 2014/0208301 | A1* | 7/2014 | Guan | G06F 9/4484 |
| | | | | 717/140 |
| 2019/0065201 | A1* | 2/2019 | Robinson | G06F 9/324 |

* cited by examiner

| REG | 1 | 2 | 3 | 4 | 5 |
|---|---|---|---|---|---|
| A0 | MAIN_ptrA | 0 | DEST_ptrA | 0 | 0 |
| A1 | MAIN_ptrB | 0 | DEST_ptrB | 0 | 0 |
| A2 | MAIN_ptrC | 0 | DEST_ptrC | 0 | 0 |
| A3 | PtrD | PtrD | PtrD | 0 | PtrD |
| A4 | MAIN_ptrE | 0 | 0 | 0 | MAIN_ptrE |
| A5 | MAIN_ptrF | 0 | 0 | 0 | MAIN_ptrF |
| A6 | MAIN_ptrG | 0 | 0 | 0 | MAIN_ptrG |
| A7 | MAIN_ptrH | 0 | 0 | 0 | MAIN_ptrH |
| A8 | MAIN_ptrI | 0 | 0 | 0 | 0 |
| A9 | MAIN_ptrJ | 0 | 0 | 0 | 0 |
| A10-A15 | 0 | 0 | 0 | 0 | 0 |
| D0 | MAIN_varA | 0 | DEST_varA | 0 | 0 |
| D1 | 0 | 0 | DEST_varB | 0 | 0 |
| D2 | 0 | 0 | DEST_varC | 0 | 0 |
| D3 | VarB | VarB | DEST_varD | 0 | 0 |
| D4 | MAIN_varC | 0 | RETURN_VAL | RETURN_VAL | RETURN_VAL |
| D5 | MAIN_varD | 0 | 0 | 0 | MAIN_varD |
| D6 | MAIN_varE | 0 | 0 | 0 | MAIN_varE |
| D7 | MAIN_varF | 0 | 0 | 0 | MAIN_varF |
| D8 | MAIN_varG | 0 | 0 | 0 | MAIN_varG |
| D9 | 0 | 0 | 0 | 0 | 0 |
| D10-15 | 0 | 0 | 0 | 0 | 0 |
| M0 | MAIN_varH | 0 | 0 | 0 | 0 |
| M1 | MAIN_varI | 0 | 0 | 0 | 0 |
| M2 | MAIN_varJ | 0 | 0 | 0 | 0 |
| M3 | MAIN_varK | 0 | 0 | 0 | MAIN_varK |
| M4 | MAIN_varL | 0 | 0 | 0 | MAIN_varL |
| M5 | 0 | 0 | 0 | 0 | 0 |
| M6 | 0 | 0 | 0 | 0 | 0 |
| M7 | 0 | 0 | 0 | 0 | 0 |
| M8 | 0 | 0 | 0 | 0 | 0 |
| M9 | 0 | 0 | 0 | 0 | 0 |
| M10-15 | 0 | 0 | 0 | 0 | 0 |

SECURING REGISTERS ACROSS SECURITY ZONES

BACKGROUND

Modern central processing units (CPUs) may have multiple partitions that provide a number of advantages. A partition is a division of processing resources, memory, or storage into multiple sets of resources so each set of resources may be operated independently. The partitions allow the context of the execution of one piece of code to be separate from another piece of code. The partitions provide integrity, where one context cannot disrupt another context. The partitions also provide confidentiality, where the details of one context are not visible to other contexts.

SUMMARY

In accordance with at least one example of the description, a system includes a processor, where the processor includes a plurality of processor registers, and where the processor is configured to execute a first instruction in a first execution context. The processor is also configured to receive a PRESERVE instruction that indicates at least one processor register among the plurality of processor registers. The processor is configured to, responsive to the PRESERVE instruction, preserve parameters in the at least one processor register and clear other processor registers in the plurality of processor registers in the first execution context. The processor is also configured to execute a second instruction in a second execution context.

In accordance with at least one example of the description, a method includes executing a first instruction in a first execution context. The method also includes storing parameters in a plurality of processor registers. The method includes receiving a PRESERVE instruction that indicates at least one processor register among the plurality of processor registers. The method also includes, responsive to the PRESERVE instruction, preserving parameters in the at least one processor register and clearing other processor registers in the plurality of processor registers. The method includes executing a second instruction in a second execution context.

In accordance with at least one example of the description, a method includes receiving a protected call instruction in a first execution context. The method also includes preserving one or more processor registers responsive to a PRESERVE instruction. The method includes executing one or more functions in a second execution context. The method also includes receiving a protected return instruction in the second execution context. The method includes executing an instruction in the first execution context responsive to the protected return instruction.

BRIEF DESCRIPTION OF THE DRAWINGS

The same reference numbers or other reference designators are used in the drawings to designate the same or similar (functionally and/or structurally) features.

DETAILED DESCRIPTION

A CPU may use multiple stacks and multiple stack pointers to separate the context of operation of one piece of code from another piece of code. Using separate contexts helps to provide security from an attack or from a fault in another piece of code. In some cases, if the CPU switches from a first execution context to a second execution context, the CPU switches which stack pointer and stack it is using. Stack pointer registers are address registers that indicate the top element of a stack. A CPU may have multiple stacks, and each stack may have an associated stack pointer register.

In some cases, as the CPU is executing code, a compiler may place a variable used by the code on a stack or in a register in the CPU. The CPU may have multiple registers of different types, such as data registers, address registers, fixed point registers, floating point registers, etc. If the CPU switches from a first execution context to a second execution context, registers may be wiped when the CPU switches for security reasons. Wiping the registers if the execution context switches also provides confidentiality. Wiping the registers may be performed via hardware or software, and wiping the registers automatically during a context switch may reduce latency.

In some cases, a first execution context may call a function in a second execution context, and the first execution context may want to pass variables to the function. If the CPU switches stacks when switching to the second execution context, the stack cannot be used to pass the variable. Also, if the registers are wiped when the execution context switches, the variable cannot be passed using the registers either. Therefore, examples described herein provide a PRESERVE instruction that allows the compiler to instruct the CPU to preserve certain registers when the execution context switches. The PRESERVE instruction selects one or more registers to be preserved, and therefore the parameters stored in those registers may be passed to a new execution context when the execution context changes.

Figure 1:
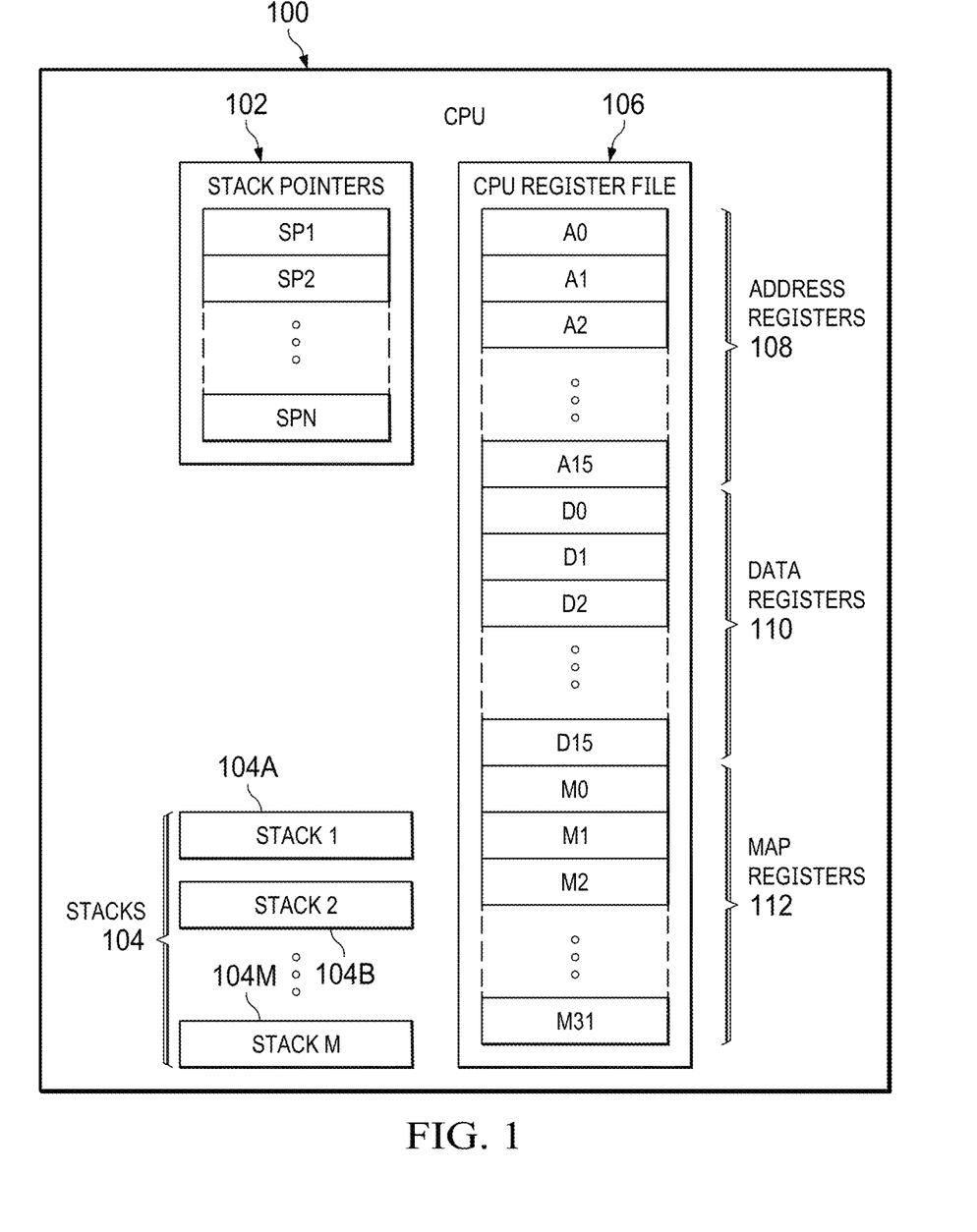
FIG. 1 is a block diagram of a CPU in accordance with various examples.

FIG. 1 is a block diagram of a CPU 100 in accordance with various examples herein. CPU 100 may be a processor, microprocessor, controller, microcontroller, or any suitable component configured to perform the processes described herein. FIG. 1 shows fewer than all elements of CPU 100. CPU 100 may also include input/output (I/O), busses, other registers, controllers, memory, other interfaces, and other components not shown in FIG. 1. In this example, CPU 100 includes stack pointer registers (SP) 102. Stack pointer registers 102 include any number of stack pointer values, such as SP1, SP2, . . . . SPN. An individual stack pointer register may be referred to herein as an SP 102. Each stack pointer register 102 may be associated with a stack 104 that includes a set of stack registers 104A-104M. In this example, stack registers 104A, 104B, . . . 104M are shown, but any number of stacks 104 and stack registers 104A-104M may be present in other examples. The stacks 104 may be of different types, such as call stacks, interrupt stacks, etc. CPU 100 also includes other registers 106. Registers 106 may include any number and type of registers. In this example, 64 registers 106 are shown. Registers 106 includes address registers 108, data registers 110, and map registers 112. In this example, CPU 100 has 16 address registers 108 (A0-A15), 16 data registers 110 (D0-D15), and 32 map registers 112 (M0-M31). Other registers may be present in CPU 100 but are not shown in FIG. 1, such as status registers, program control registers, etc.

In one example, address registers 108 are used for addressing operations, but may also be used to perform simple math operations, such as ADD, SHIFT, OR, XOR, etc. In an example, data registers 110 are fixed point math registers. The data registers 110 can perform fixed point math operations. In an example, map registers 112 are floating point math registers. Map registers 112 may be used to perform floating point math operations. In some examples herein, the registers 106 are 32-bit registers. The registers 106 may be used as individual 32-bit registers, or used in 64-bit register pairs for 64-bit load/store operations to or from memory, or for 64-bit register to register moves. In other examples, the registers 106 may be another size.

In one example, CPU 100 may have a different security or execution context for each SP 102. If CPU 100 has eight stack pointer registers 102, then CPU 100 could have eight different execution contexts. Any number of stack pointer registers 102 or execution contexts could be present in other embodiments. In operation, if a call instruction stays in the same stack 104, it is treated as a normal call instruction. If a call instruction changes the SP 102, a protected call is performed. A protected call is a call that switches the SP 102, thereby switching the execution context. As described above, the registers 106 could be cleared when the SP 102 is switched for security or confidentiality. However, if the program has parameters stored in registers 106 that are to be kept when the context switches, the PRESERVE instruction described herein is used along with the call instruction. The PRESERVE instruction preserves parameters in the selected processor registers 106 during the context switch so the parameters stored in the protected registers 106 may be used during the second execution context.

In CPU 100, multiple instructions may be executed in parallel, and instructions to be run in parallel may be grouped in packets. In one example, instruction packets are 128 bits wide, and instructions are 16, 32, or 48 bits wide. The compiler determines which instructions may be run in parallel and places the instructions in instruction packets.

The PRESERVE instruction may be run in parallel with other instructions in CPU 100, in order to preserve the state of one or more registers 106 for the other instruction. As an example, a CALL.PROT instruction is a protected call instruction that runs in parallel with a PRESERVE instruction in a first execution context. In other examples, the PRESERVE instruction could be run before the CALL-.PROT instruction, rather than in parallel with the CALL-.PROT instruction. In another architecture, a CPU 100 could include a field in the CALL.PROT instruction that indicates what registers 106 to preserve during the call. However, in this example, the PRESERVE instruction is a separate instruction from the CALL.PROT instruction.

In a CALL.PROT instruction, logic in CPU 100 automatically clears all registers 106 except for the registers 106 indicated by the corresponding PRESERVE instruction that runs prior to or in parallel with the CALL.PROT instruction. In one example, the PRESERVE instruction is designed such that the compiler can add the PRESERVE instruction at the compiler's discretion. For example, the compiler may determine that a function is called that uses a different stack 104 or a different execution context, and the function provides certain parameters. The compiler determines that those certain parameters are in specific processor registers 106. Then, the compiler creates a PRESERVE instruction that preserves those specific processor registers 106.

After the CALL.PROT and PRESERVE instructions are executed, CPU 100 switches to the second execution context. Code runs in the second execution context, and uses the preserved parameters stored in the registers 106 that were preserved by the PRESERVE instruction. The code that runs in the second execution context may include one or more functions. The other registers 106 were cleared when the execution context switched, and may be used for operations in the second execution context. After the code in the second execution context is complete, CPU 100 may return to the first execution context. To perform the return, a return instruction is executed. In this example, the return instruction is a protected return instruction called RET.PROT. The RET.PROT instruction clears the registers 106 on the return to the first execution context. In some examples, the RET-.PROT instruction may also be executed in parallel with a PRESERVE instruction to pass one or more return parameters back to the first execution context stored in the registers 106.

The PRESERVE instruction may preserve the registers 106 using any suitable technique. In one example, the PRESERVE instruction uses mask bits to indicate which registers 106 should be preserved during the context switch. In one example, the PRESERVE instruction is 48 bits long, and 40 of the bits are used to indicate which registers 106 should be preserved. If there are more than 40 registers 106 in CPU 100, then some of the registers 106 may not be able to be preserved during a context switch. In other examples, the instruction may be longer or shorter than 48 bits, and a different number of mask bits may be available.

In another example, a preserve all instruction may be available. The preserve all instruction instructs the compiler to preserve all of the registers 106 that are capable of being preserved. The preserve all instruction may be a smaller instruction, such as 16 bits instead of 48 bits, because the instruction does not indicate which of the registers 106 are to be preserved.

Figure 2:
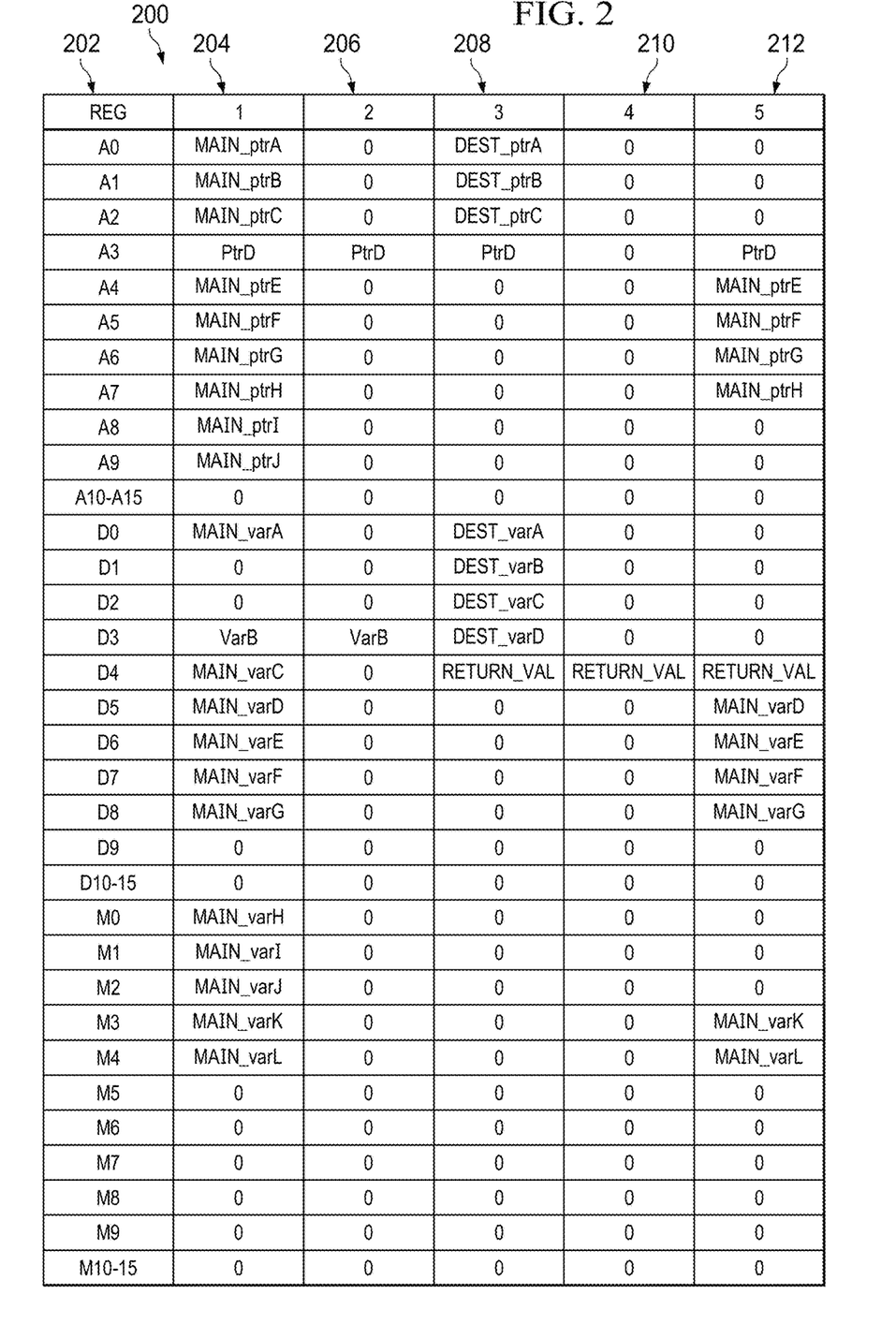
FIG. 2 is a table of registers in accordance with various example.

FIG. 2 is a table 200 of registers 106 in accordance with various examples herein. FIG. 2 shows the contents of registers 106 at different points in time to describe the use of a PRESERVE instruction during a context switch in one example. Table 200 includes columns 202, 204, 206, 208, 210, and 212. Column 202 includes the names of the registers 106. Registers A0-A15 in column 202 are address registers 108. Registers D0-D15 are data registers 110. Registers M0-M15 are map registers 112. In this example, registers A0-A15, D0-D15, and M0-M15 are shown. Other registers 106 may be present in other examples. Fewer registers may be shown or present in other examples. In this examples, registers A10-A15 are shown as one row in table 200 for simplicity. A 0 value is stored in each of these registers 106. Registers D10-D15 are also shown as one row for simplicity, and registers M10-M15 are shown as one row for simplicity.

As an overview of the example process described with respect to FIG. 2, a processor may be executing a first function or collection of functions in a first execution context, where a function is a collection of code executable by a processor. If a second function is to be executed by the processor, and the compiler determines that the second function should be executed in a second execution context, the compiler prepares the processor for switching to the second execution context. In this example, the second function is called DestFunction. DestFunction may be any example function, such as an arithmetic operation, a logical operation, an I/O operation, etc., or any combination of operations embodied within a function. Switching to the second execution context may include preserving certain parameters stored in registers from the first execution context as described herein, so those parameters can be passed to the second execution context and used by the second function (e.g., DestFunction). After DestFunction (and any other functions) finishes execution in the second execution context, the compiler may return to the first execution context and proceed again with executing instructions in the first execution context, such as executing more instructions or calling another function. Parameters from the second execution context may also be passed to the first execution context when the compiler returns back to the first execution context.

Column 204 (column 1) shows the values stored in the registers 106 during a first execution context. The address registers store pointers in this example (e.g., Main_ptrA in register A0, Main_ptrJ in register A9, etc.). The data registers store data values, such as Main_varA in register D0, Main_varG in register D8, etc. The map registers also store data values, such as Main_varH in M0, Main_varL in register M4, etc. The parameters to be passed to the second execution context are stored in registers A3 and D3 in this example. Those two registers 106 will be preserved with the PRESERVE instruction in this example. Independently, if any values stored in registers 106 (whether or not those registers are preserved) are to be saved so they can be used when the first execution context resumes after the second execution context completes, those values may be stored in local storage before the PROT.CALL and the PRESERVE instruction are executed. Space may be allocated in local storage for these registers 106 to be preserved across the call. As an example, the content of registers A3-A7, D5-D8, and M3-M4 will be saved during the protected call so those registers 106 may be repopulated after the second execution context is complete and the first execution context resumes.

As the process begins, the processor is operating in a first execution context, and the compiler determines that a function (called DestFunction in this example) is to be executed in a second execution context. Therefore, the compiler preserves the first execution context and passes the appropriate parameters to the second execution context, where DestFunction will execute using those parameters. In this example, the appropriate parameters are stored in registers A3 and D3. Registers A3 (PtrD) and D3 (VarB) will therefore be passed from the first execution context to the second execution context with the PRESERVE instruction in this example. Other registers may be passed in other examples. First, in the first execution context, local space is allocated to save the contents of registers A3-A7, D5-D8, and M3-M4. The content of those registers is saved. Then, the CALL.PROT instruction is executed in parallel with the PRESERVE instruction in the first execution context. The CALL.PROT instruction calls the second function (DestFunction in this example) which will be executed in the second execution context. The CALL.PROT instruction indicates that a function is being called, and the call will be a protected call. Because the call is a protected call, in parallel, the PRESERVE instruction masks registers A3 and D3 so the content stored in those registers is passed to the second execution context. All other registers 106 will be zeroed or otherwise invalidated.

Column 206 shows the result of executing the CALL.PROT instruction in parallel with the PRESERVE instruction. After executing these instructions, the CPU 100 is operating in the second execution context, where DestFunction will then be executed. This second execution context may use a different stack 104 than the first execution context. In this second execution context, the registers 106 were zeroed except for registers A3 and D3, as shown in column 206. Therefore, when switching execution contexts, the security and confidentiality of the first execution context are maintained. The only values in the registers 106 that are passed from the first execution context to the second execution context are the values in registers A3 and D3, which were preserved by the PRESERVE instruction. The confidentiality of the first execution context is maintained, because the second execution context only receives the content in registers A3 and D3, rather than the content in all the processor registers 106. Also, the integrity of the second execution context is maintained, because the first execution context cannot disrupt the second execution context by storing unwanted content in a register 106 that is passed to the second execution context, outside of the registers 106 protected by the PRESERVE instruction.

At this time, DestFunction may execute in the second execution context, using the parameters stored in registers A3 and D3 along with any other appropriate parameters. Column 208 shows that some of the registers 106 may be used by DestFunction to store data during execution, such as A0-A3 and D0-D4. In some examples, the second function (DestFunction) may provide a return parameter upon its completion. A return parameter is a value stored in a register 106 that will be passed from the second execution context back to the first execution context using a PRESERVE instruction, for use by another function that will be executed in the first execution context. Any number of return parameters may be present, up to the number of registers 106 that are capable of being preserved. In this example, one return parameter is stored in register D4 (Return Val) after DestFunction executes.

To return to the first execution context after DestFunction executes, a RET.PROT instruction is executed in parallel with or without a PRESERVE instruction. In this example, the PRESERVE instruction masks the D4 register, so the parameter in the D4 register (e.g., the return parameter) may be returned to the first execution context. Column 210 shows that after the RET.PROT and PRESERVE instructions are executed, the registers 106 have all been cleared except for the D4 register.

After returning to the first execution context, the CPU may run an EXIT.PROT instruction. This instruction restores any registers that were preserved across the call, as described above with respect to column 204. Local space was allocated to save the contents of registers A3-A7, D5-D8, and M3-M4. The content of those registers was saved, and EXIT.PROT restores those registers. Also, the content of register D4 (e.g., the return parameter) was preserved by the PRESERVE instruction during the context switch from the second execution context back to the first execution context. Therefore, column 212 shows that the registers A3-A7, D4-D8, and M3-M4 have been populated. Execution of instructions and functions within the first execution context can then continue. The return parameter stored in register D4 may be checked for an expected value by an instruction in the first execution context in some examples (for example, to determine if the return parameter is the right type of data, such as floating point, fixed point, etc.). Also, the space that was allocated to save registers A3-A7, D5-D8, and M3-M4 may be de-allocated.

The example operations described with respect to FIG. 2 show how parameters stored in registers 106 may be passed from one execution context to another while maintaining security and integrity between the execution contexts. In this example, the PRESERVE instruction is executed in parallel with other instructions, such as CALL.PROT and RET.PROT. In other examples, the PRESERVE instruction may be executed before the other instructions.

Figure 3:
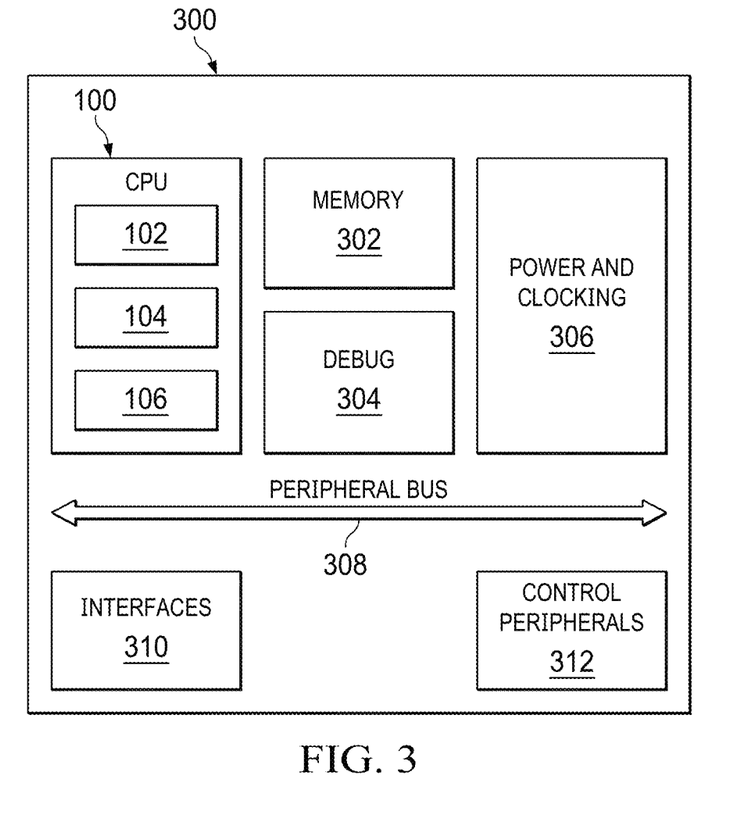
FIG. 3 is a block diagram of a system for securing registers across security zones in accordance with various examples.

FIG. 3 is a block diagram of an example system 300 for securing registers across security zones in accordance with various examples herein. System 300 may be a computing system with components for performing the examples described herein. System 300 includes a CPU 100. The CPU may be a CPU 100 as described herein with respect to FIG. 1. CPU 100 includes stack pointer registers 102, stacks 104, and registers 106 in this example. System 300 includes memory 302. Memory 302 may include random access memory (RAM), read-only memory (ROM), FLASH memory, etc. System 300 also includes debug module 304, such as JTAG (Joint Test Action Group). System 300 may include power and clocking hardware 306, such as power supplies, clock circuitry, etc. System 300 may also include a peripheral bus 308 and/or other busses to communicate with peripherals or between components in system 300. System 300 may also include interfaces 310, such as serial interfaces, wired or wireless interfaces, a controller area network (CAN), etc. System 300 may include control peripherals 312, such as capture modules, hardware decoding modules, analog modules, etc. The components in system 300 may perform the operations described herein in some examples.

Figure 4:
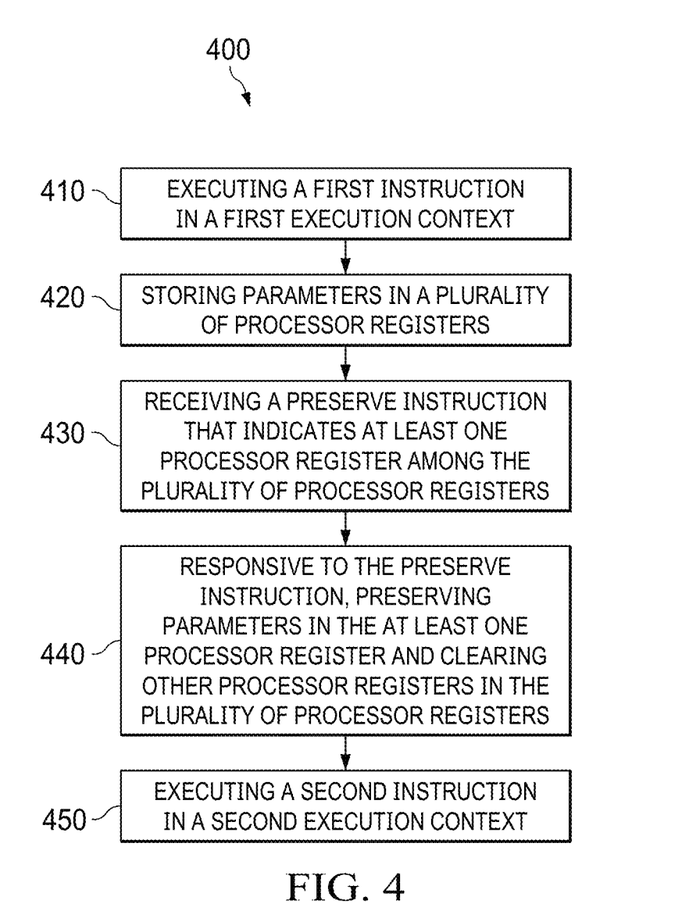
FIG. 4 is a flow diagram of a method for securing registers across security zones in accordance with various examples.

FIG. 4 is a flow diagram of a method 400 for securing registers across security zones in accordance with various examples herein. The steps of method 400 may be performed in any suitable order. The hardware components described above with respect to FIG. 1 or 3 may perform method 400 in some examples. Any suitable hardware or digital logic may perform method 400 in some examples.

Method 400 begins at 410 where a processor, such as CPU 100, executes a first instruction in a first execution context. The first execution context may include a first stack pointer register 102 associated with the first stack 104. The first execution context may include other resources of CPU 100 as well.

Method 400 continues at 420, where CPU 100 stores parameters in a plurality of processor registers 106. The parameters may be stored, deleted, rewritten, etc., as program code is executed by CPU 100 in the first execution context.

Method 400 continues at 430, where CPU 100 receives a PRESERVE instruction that indicates at least one processor register 106 among the plurality of processor registers 106. As described above, the compiler may create the PRESERVE instruction for certain processor registers 106 based on the instructions received in an instruction packet. The PRESERVE instruction may be executed in parallel with a protected call instruction in one example. In another example, the PRESERVE instruction may be a part of a protected call instruction.

Method 400 continues at 440, where, responsive to the PRESERVE instruction, CPU 100 preserves parameters in the at least one processor register 106 and clears other processor registers 106 in the plurality of processor registers 106. These actions are performed as part of the PRESERVE instruction. In an example, all processor registers 106 are cleared except those that are designated for preservation by the PRESERVE instruction.

Method 400 continues at 450, where CPU 100 executes a second instruction in a second execution context. Switching to the second execution context may include switching to another stack 104 in an example. The second instruction may use the parameters stored in the processor registers 106 preserved by the PRESERVE instruction. In some examples, after the code is executed in the second execution context, the CPU 100 may return to the first execution context and execute a third instruction or another function. When returning to the first execution context, a PRESERVE instruction may be useful for passing a return parameter from the second execution context to the first execution context.

Figure 5:
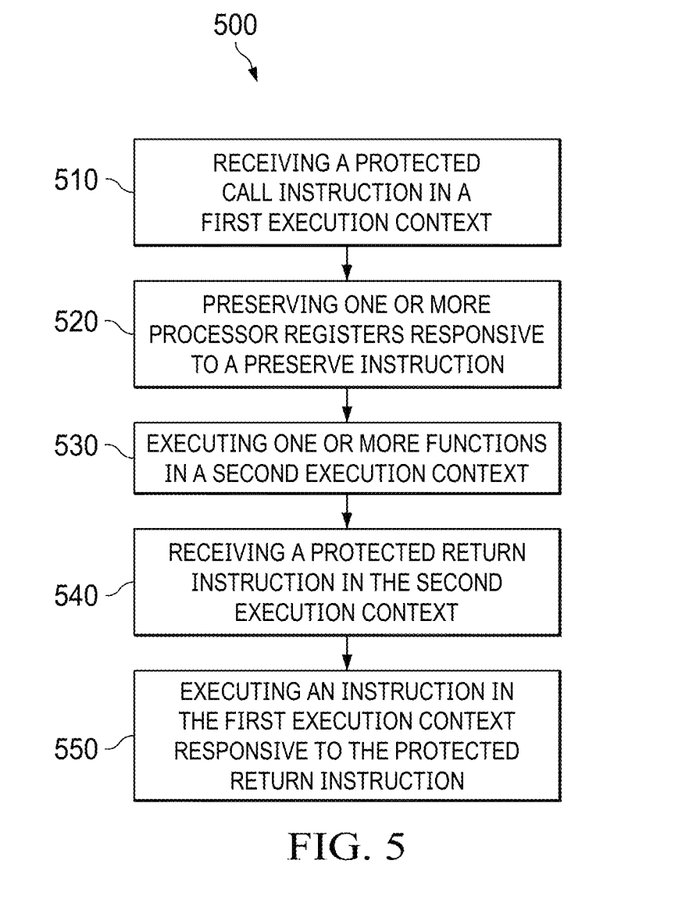
FIG. 5 is a flow diagram of a method for securing registers across security zones in accordance with various examples.

FIG. 5 is a flow diagram of a method 500 for securing registers across security zones in accordance with various examples herein. The steps of method 500 may be performed in any suitable order. The hardware components described above with respect to FIG. 1 or 3 may perform method 500 in some examples. Any suitable hardware or digital logic may perform method 500 in some examples.

Method 500 begins at 510, where a processor such as CPU 100 receives a protected call instruction in a first execution context. The first execution context may include a first stack and a first stack pointer register.

Method 500 continues at 520, where the processor preserves one or more processor registers in response to a PRESERVE instruction. A compiler may create the PRESERVE instruction in some examples. In some examples, the protected call instruction and the PRESERVE instruction may be executed in parallel.

Method 500 continues at 530, where CPU 100 executes one or more functions in the second execution context. The second execution context may execute functions using the preserved parameters in some examples. The second execution context may use a different stack than the first execution context in some examples.

Method 500 continues at 540, where CPU 100 receives a protected return instruction in the second execution context. The compiler may also create a PRESERVE instruction in some examples if a parameter stored in a register is to be passed to a different execution context.

Method 500 continues at 550, where CPU 100 executes an instruction in the first execution context responsive to the switching to the first execution context via the protected return instruction. CPU 100 may then continue processing additional operations or functions in the first execution context, using the first stack and the first stack pointer register.

In examples herein, processor registers may be secured across security contexts or security zones. The examples herein help to maintain the integrity and confidentiality of the different security contexts. Security contexts may be switched quickly and without a managing operating system with the examples described herein. A single instruction (the PRESERVE instruction) allows software or a compiler to choose which registers to expose to the other execution context. Other registers may be cleared quickly during the context switch. In some examples, context switches may be performed much more quickly than with other techniques. The PRESERVE instruction also provides the ability to use the processor registers 106 for cross context function calls and returns. In some examples, the PRESERVE instruction is designed to fit into the same instruction packet as protected call and protected return instructions that trigger the clearing of the processor registers 106. Therefore, the masked clearing of registers takes no more extra time above the call itself. The examples herein may save dozens or hundreds of cycles for each context switch.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a parameter means being within +/−10 percent of that parameter. Modifications are possible in the described examples, and other examples are possible within the scope of the claims.

What is claimed is:

1. A system, comprising:
a processor, wherein the processor includes a plurality of processor registers that includes a first processor register and a second processor register, and wherein the processor is configured to:
    execute a first instruction in a first execution context, wherein the first instruction is associated with a transition to a second execution context;
    receive a PRESERVE instruction that indicates the first processor register among the plurality of processor registers;
    responsive to the PRESERVE instruction and the transition from the first execution context to the second execution context, preserve a value in the first processor register by clearing the second processor register without clearing the first processor register; and
    execute a second instruction in the second execution context.

2. The system of claim 1, wherein the processor includes a stack pointer register for each execution context.

3. The system of claim 1, wherein the PRESERVE instruction includes one or more mask bits configured to specify at least one processor register to preserve from among the plurality of processor registers.

4. The system of claim 1, wherein executing the second instruction includes executing the second instruction with the preserved value from the first processor register.

5. The system of claim 1, wherein:
the first instruction is a protected call instruction; and
the PRESERVE instruction is part of the protected call instruction.

6. The system of claim 1, wherein:
the PRESERVE instruction is a first PRESERVE instruction; and
the processor is further configured to:
    receive a second PRESERVE instruction in the second execution context that specifies one or more of the first processor register or the second processor register;
    responsive to the second PRESERVE instruction and a transition from the second execution context to the first execution context, preserve a value in the one or more of the first processor register or the second processor register specified by the second PRESERVE instruction without clearing the one or more of the first processor register or the second processor register; and
    execute a third instruction in the first execution context.

7. The system of claim 1, wherein the PRESERVE instruction is a 48-bit instruction.

8. The system of claim 1, wherein:
the first instruction is a protected call instruction; and
the processor is configured to execute the PRESERVE instruction in parallel with the protected call instruction.

9. The system of claim 1, wherein the plurality of processor registers has a set of address registers, a set of fixed-point registers, and a set of floating-point registers.

10. A method, comprising:
storing values in a plurality of processor registers that includes a first processor register and a second processor register;
executing a first instruction in a first execution context, wherein the first instruction is associated with a transition to a second execution context;
receiving a PRESERVE instruction that specifies the first processor register among the plurality of processor registers;
responsive to the PRESERVE instruction and the transition from the first execution context to the second execution context, preserving a value in the first processor register by clearing the second processor register without clearing the first processor register; and
executing a second instruction in the second execution context.

11. The method of claim 10, wherein the PRESERVE instruction includes one or more mask bits configured to specify at least one processor register to preserve from among the plurality of processor registers.

12. The method of claim 10, wherein executing the second instruction includes executing the second instruction with the preserved value from the first processor register.

13. The method of claim 10, wherein:
the PRESERVE instruction is a first PRESERVE instruction; and
the method further comprises:
    receiving a second PRESERVE instruction in the second execution context that specifies one or more of the first processor register or the second processor register;
    responsive to the second PRESERVE instruction and a transition from the second execution context to the first execution context, preserving a value in the one or more of the first processor register or the second processor register specified by the second PRESERVE instruction without clearing the one or more of the first processor register or the second processor register; and
    executing a third instruction in the first execution context.

14. The method of claim 10, wherein:
the first instruction is a protected call instruction; and
the method further comprises executing the PRESERVE instruction in parallel with the protected call instruction.

15. The method of claim 10, wherein the plurality of processor registers includes address registers and data registers.

16. The method of claim 10, wherein the plurality of processor registers has a set of address registers, a set of fixed-point registers, and a set of floating-point registers.

17. A method, comprising:
receiving a protected call instruction in a first execution context, wherein the protected call instruction is associated with a transition to a second execution context;
preserving a value in a first processor register responsive to a PRESERVE instruction and the transition from the first execution context to the second execution context by clearing a second processor register without clearing the first processor register;
executing one or more functions in the second execution context;

receiving a protected return instruction in the second execution context; and executing an instruction in the first execution context responsive to the protected return instruction.

18. The method of claim 17, wherein the PRESERVE instruction includes one or more mask bits configured to specify at least one processor register to preserve from among a plurality of processor registers.

19. The method of claim 17, wherein executing the one or more functions includes executing a function using the value in the first processor register.

20. The method of claim 17 wherein each of the first processor register and the second processor register is from a group consisting of an address register, a fixed-point register, and a floating-point register.

\* \* \* \* \*